US006788919B2

(12) United States Patent
Watanabe

(10) Patent No.: US 6,788,919 B2
(45) Date of Patent: Sep. 7, 2004

(54) CELLULAR PHONE

(76) Inventor: Masahiro Watanabe, 3-15-12 Narimasu, Itabashi-ku, Tokyo (JP)

( * ) Notice: Subject to any disclaimer, the term of this patent is extended or adjusted under 35 U.S.C. 154(b) by 512 days.

(21) Appl. No.: 09/813,716

(22) Filed: Mar. 21, 2001

(65) Prior Publication Data

US 2002/0137537 A1 Sep. 26, 2002

(51) Int. Cl.[7] .................................................. H04B 1/38

(52) U.S. Cl. ...................... 455/90.3; 455/344; 455/347; 455/575.1; 455/575.3; 379/434

(58) Field of Search ................................ 455/566, 90.3, 455/575.1, 575.8, 556.1, 575.3, 344, 347; 379/428.01, 428.04, 433.1, 433.11, 434

(56) References Cited

U.S. PATENT DOCUMENTS

| | | | | |
|---|---|---|---|---|
| 5,566,224 A | * | 10/1996 | Ul Azam et al. ........... | 455/566 |
| 6,311,077 B1 | * | 10/2001 | Bien .......................... | 455/566 |
| D470,627 S | * | 2/2003 | Kuo ............................ | D28/77 |
| 6,554,437 B2 | * | 4/2003 | von Glasow ................ | 359/872 |

* cited by examiner

*Primary Examiner*—Charles Craver
(74) *Attorney, Agent, or Firm*—Jordan and Hamburg LLP

(57) ABSTRACT

A cellular phone including a cosmetics container can be contained without becoming complicated or being bulky inside of the handbag, and it can take out from a handbag etc. easily and can be used when the phone receives a message. In addition, it can prevent forgetting a cellular phone and cosmetics efficiently.

6 Claims, 11 Drawing Sheets

15 1B 6 2 18 10 25 26 24 23 22 24 23 22 24 22 23 24 23 14A 22 3B 17 16

CELLULAR PHONE

BACKGROUND OF THE INVENTION

The present invention relates generally to a cellular telephone.

The conventional cellular phone functions solely as a cellular phone. Almost all people carry the cellular phone in the pockets of clothes, bags, handbags, etc.

Women carry the cellular phone in a handbag along with cosmetics, etc. resulting in confusion when accessing the cellular phone. When a cellular phone receives a message it is difficult to retrieve the cellular phone from the inside of a handbag.

SUMMARY OF THE INVENTION

Accordingly, it is an object of the present invention to provide a cellular phone that reduces storage complications inside of a handbag and is not bulky.

It is another object of the present invention to provide the cellular phone that is easily retrieved when a cellular phone.

It is still another object of the present invention to provide a cellular phone and cosmetics.

The novel features which are believed to be characteristic of the invention, both as to its organization and method of operation, together with further objects and advantages thereof, are described below with reference to the accompanying drawings in which a presently preferred embodiment of the invention is illustrated as an example.

It is to be expressly understood, however, that the drawings are for the purpose of illustration and description only, and are not intended as a definition of the limits of the invention.

DETAILED DESCRIPTION

Figure 1:
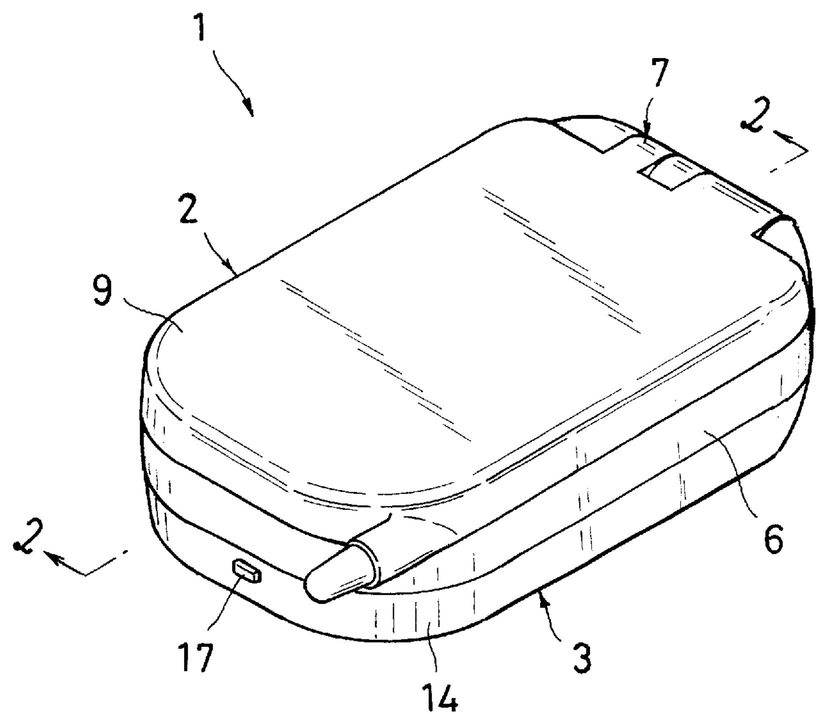
FIG. 1 is a perspective view showing a first embodiment of the present invention.
Figure 2:
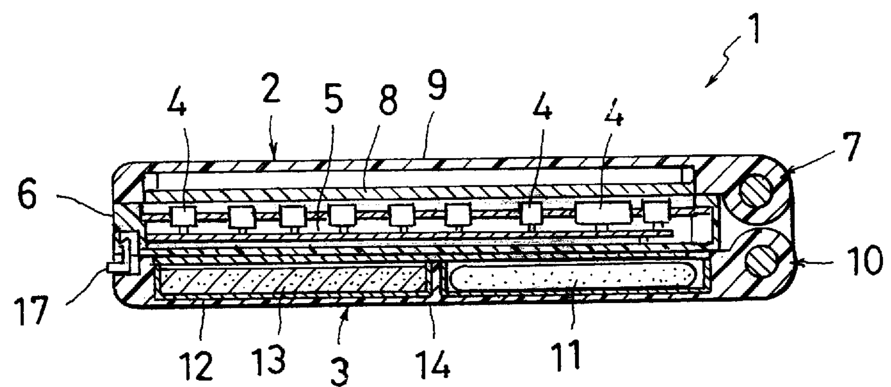
FIG. 2 is a cross-sectional view taken along the line 2—2 of FIG. 1.
Figure 3:
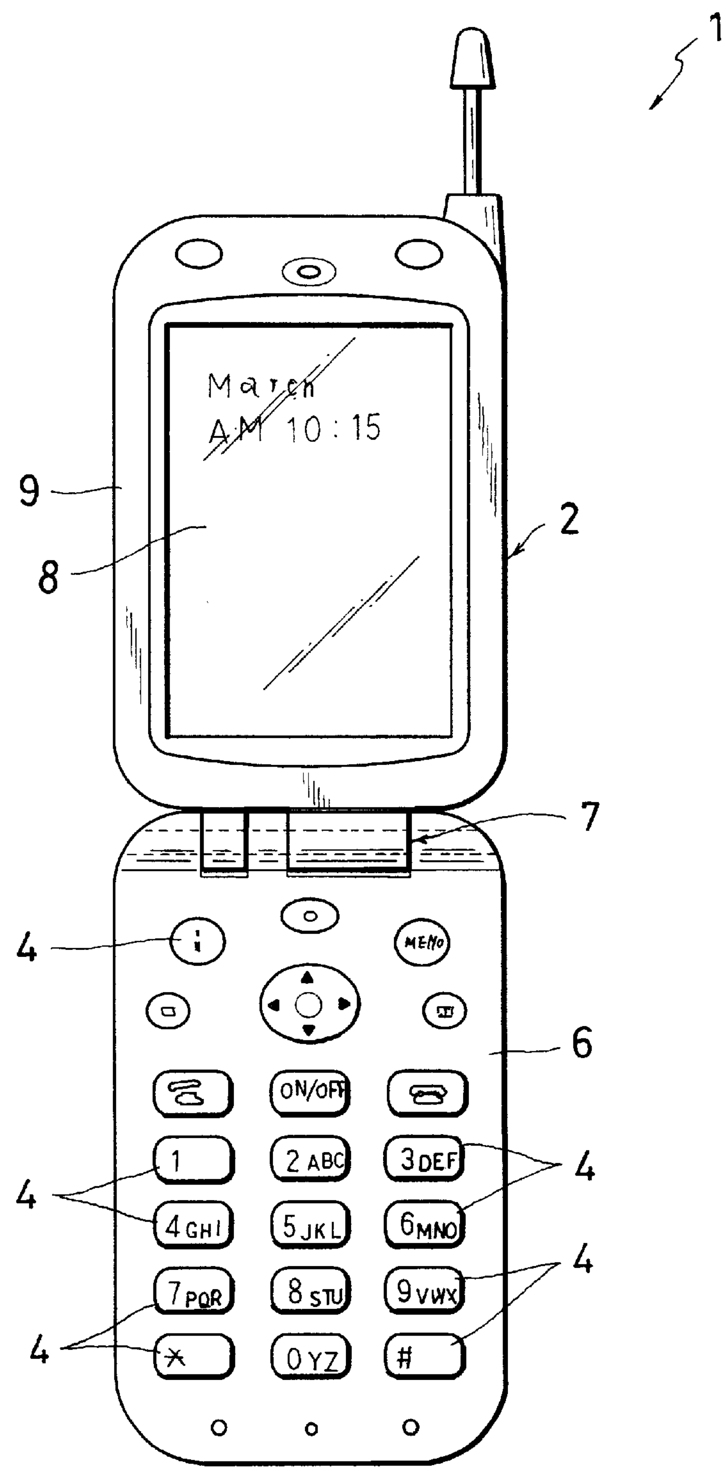
FIG. 3 is a view of a cellular phone body in use showing the first embodiment of the present invention.
Figure 4:
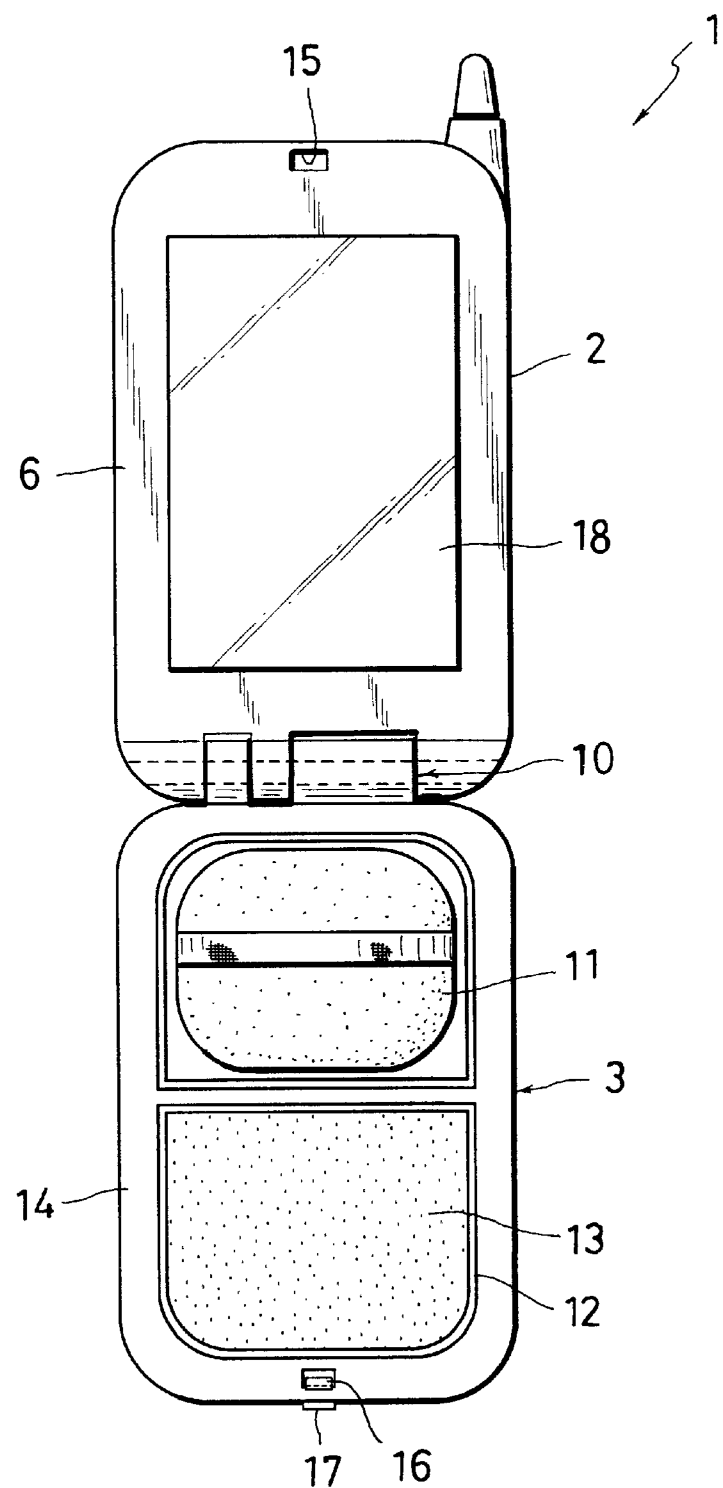
FIG. 4 is a view of a cosmetics container in use of the first embodiment of the present invention.

Preferred embodiments of the present invention are described in more detail below referring to the accompanying drawings.

An understanding of the present invention may be best gained by reference FIGS. 1 to 4. FIGS. 1 to 4 illustrate a cellular telephone 1 of a first embodiment of the present invention.

The cellular phone 1 has a cosmetics container 3 attached in a back of a cellular phone body 2. The cellular phone body 2 of the cellular phone 1 comprises a case body 6 including a plurality of operation buttons 4 and a cellular phone circuits 5, and a cover body 9 equipped with a display 8 attached to the case body 6 so as to open and close through hinge member 7.

The cosmetics container 3 comprises a cosmetics case 14, a button 17 for opening and shutting and a mirror 18. The cosmetics case 14 is attached to the case body 6 of the cellular phone body 2 by a hinge member 10 so as to cover the back of the case body 6. The cosmetics case 14 can container a puff 11, foundation 13 provided into a palette 12 attached detachably or the like. The button 17 is attached in the central part of the open end of the cosmetics case 14, and has an engagement projection 16 that engages detachably with an engagement 15 attached in the case body 6. The mirror 18 is provided at the back part of the case body 6 and covers the cosmetics case 14, the mirror 18 may be a mirror like finish or a mirror attached thereto by adhesives.

Since the cellular phone body 2 and the cosmetics container 3 are unified, the user holds the cosmetics container 3 automatically by holding the cellular phone 1.

In telephoning the cover body 9 opens and is used as the conventional cellular phone and the case body 6 is covered with the cover body 9 at the time of non-use.

When make-up is to be used the button 17 is operated, and the cosmetics case 14 is opened wide from the case body 6 and the mirror 18 of the back of the case body 6 is expose, and access to the puff 11 and the foundation 13 is provided.

Other embodiments of the present invention will now be described referring to FIGS. 5 to 14. Through the drawings of the embodiments, like components are denoted by like numerals as of the first embodiment and will not be further explained in great detail.

Figure 5:
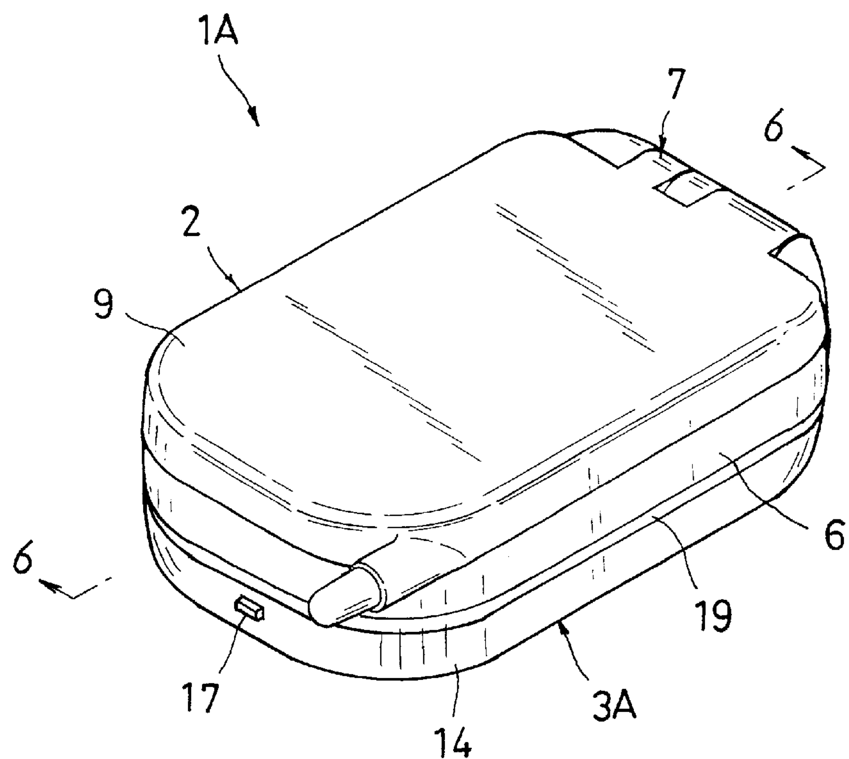
FIG. 5 is a perspective view showing a second embodiment of the present invention.
Figure 6:
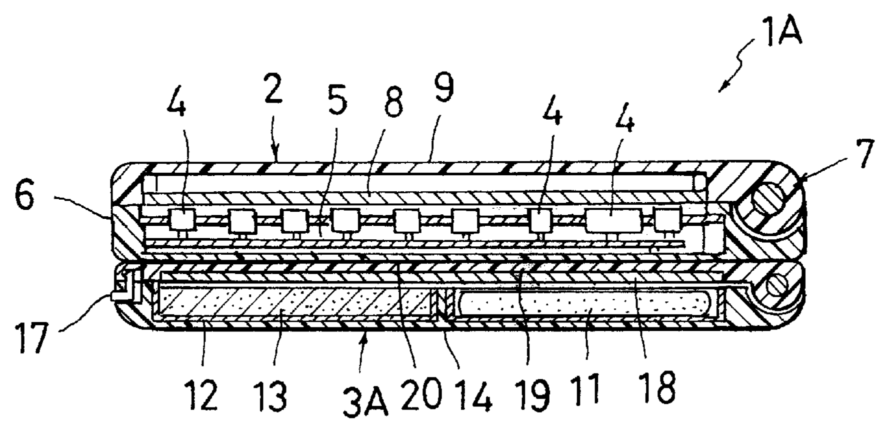
FIG. 6 is a cross-sectional view taken along the line 6—6 of FIG. 5.
Figure 7:
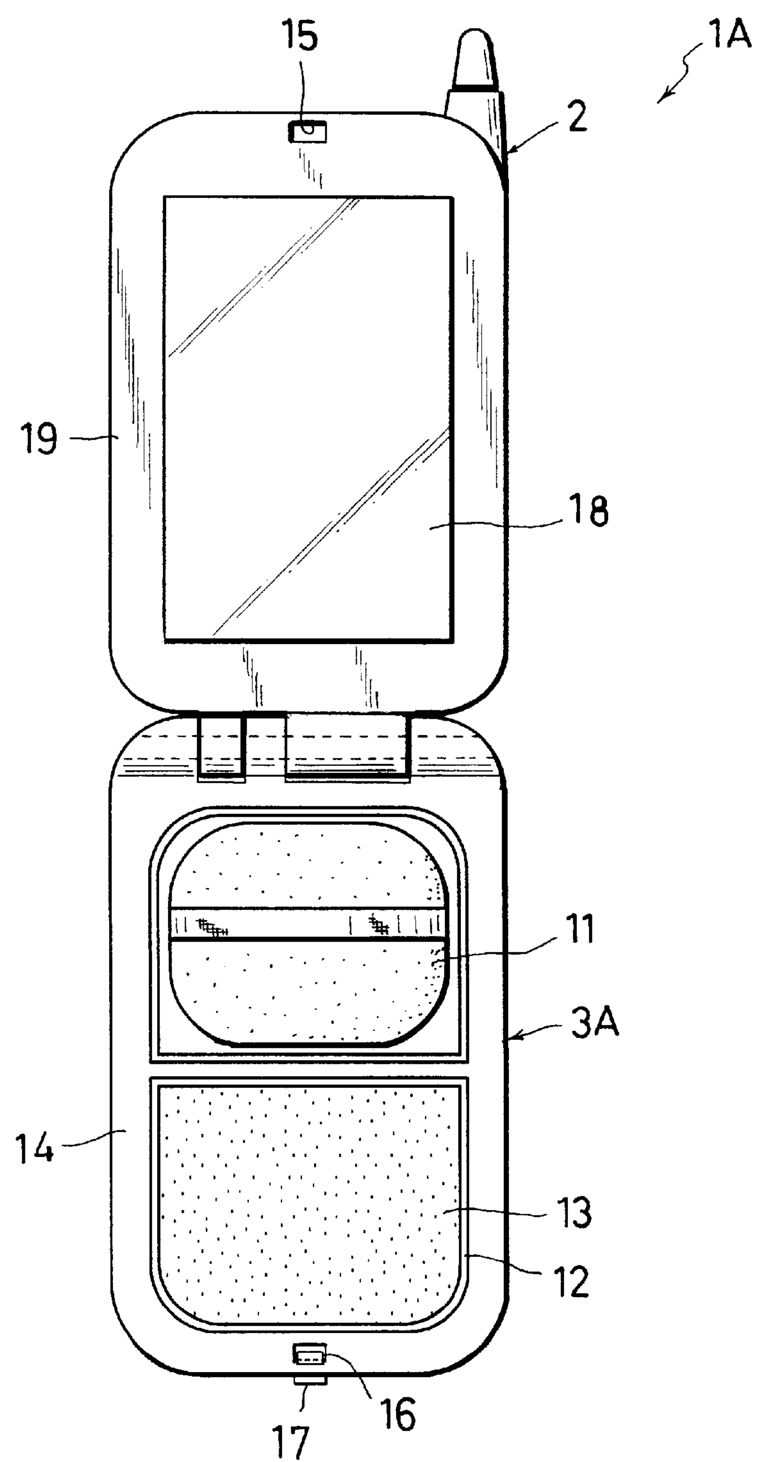
FIG. 7 is a view of a cosmetics container in use of the second embodiment of the present invention.
Figure 8:
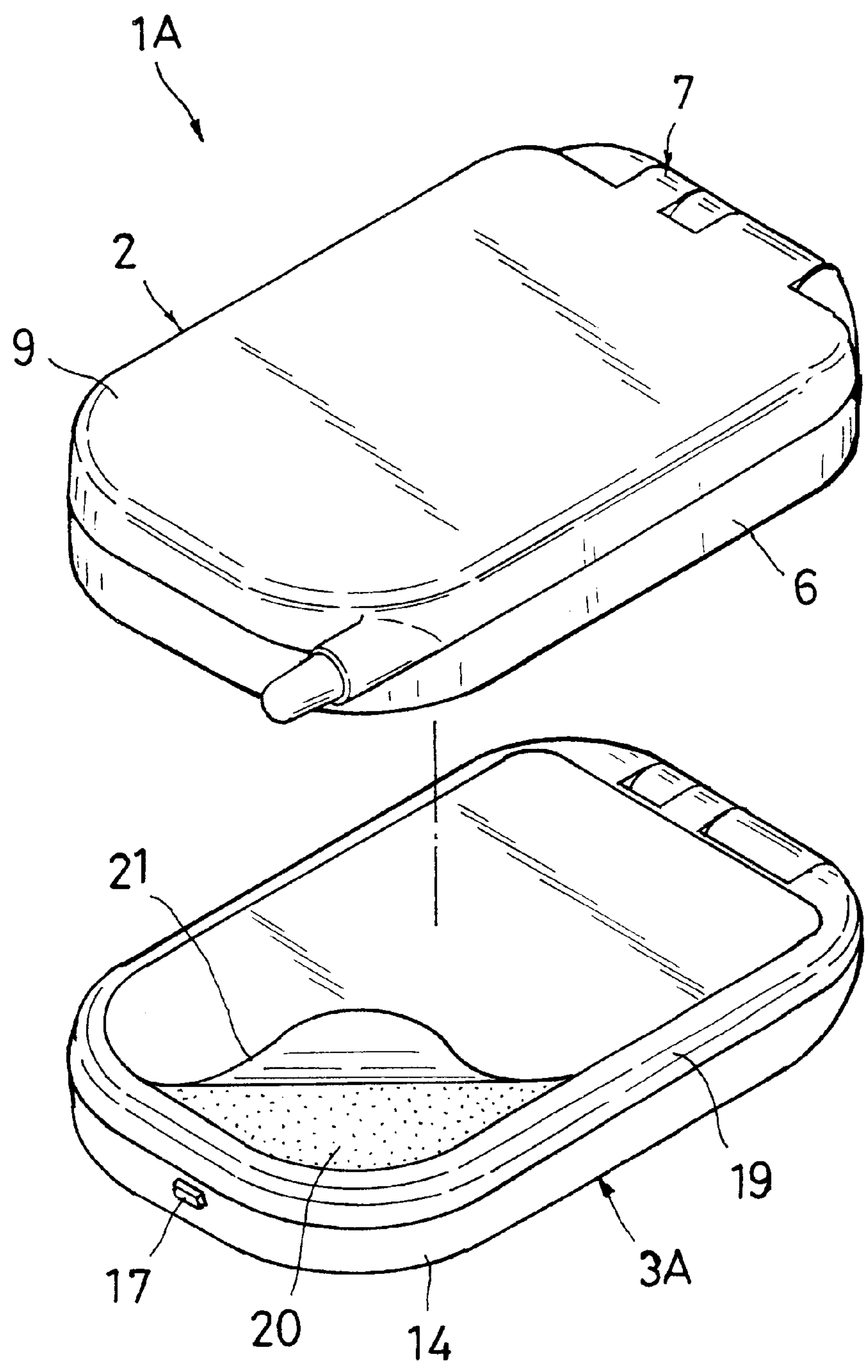
FIG. 8 is a view of a condition before installing showing the second embodiment of the present invention.

A second embodiment of the present invention is shown in FIGS. 5 to 7. It is distinguished from the first embodiment by the fact that an outer wall side of a cosmetics cover body 19 is attached at the back of the case body 6, and the mirror 18 is fixed to an inner wall surface of the cosmetics cover body 19. A cellular phone 1A with the cosmetics container 3A according to the second embodiment has similar advantages to that according to the first embodiment.

By applying adhesives 20 to the outer wall side of the cosmetics cover body 19 and covering in exfoliation paper 21, the exfoliation paper 21 can be removed at the back of the case body 6 of the cellular phone body 2, and it can fix to it with adhesives 20.

Figure 9:
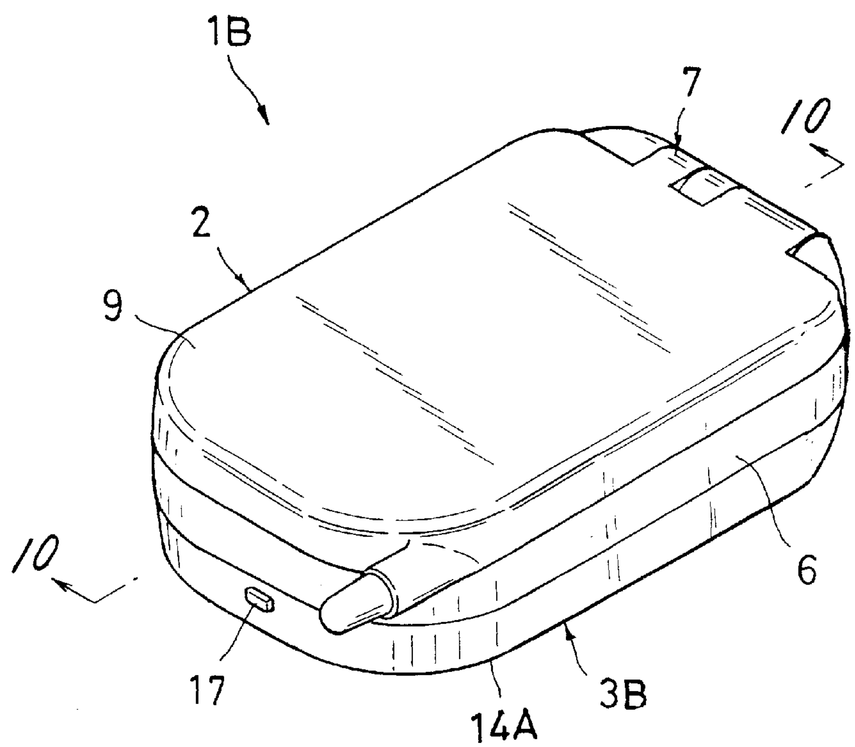
FIG. 9 is a perspective view showing a third embodiment of the present invention.
Figure 10:
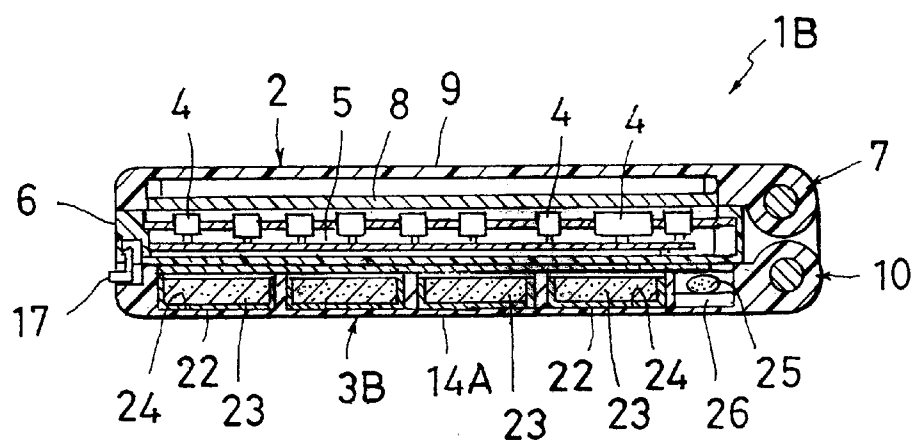
FIG. 10 is a cross-sectional view taken along the line 10—10 of FIG. 9.
Figure 11:
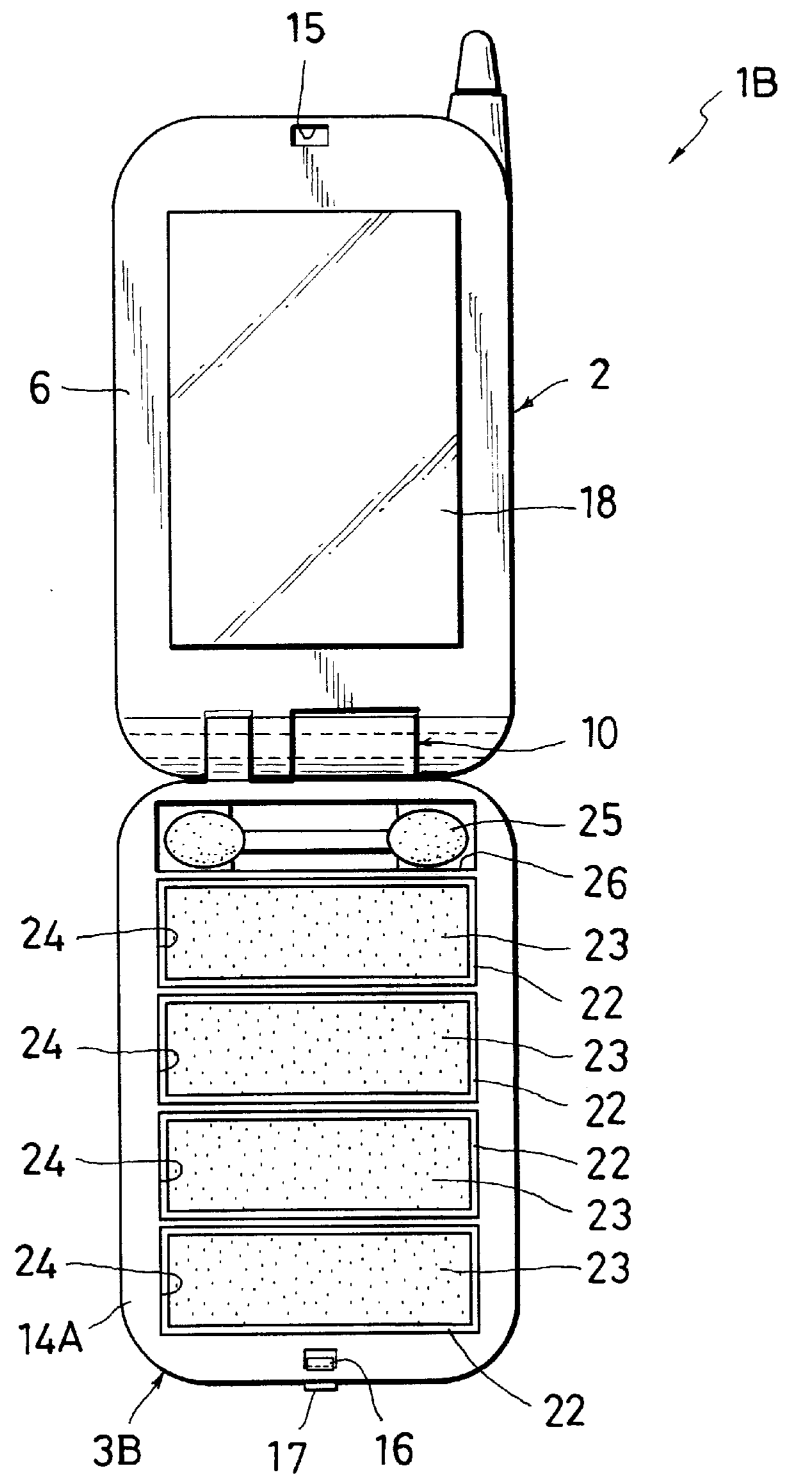
FIG. 11 is a view of a cosmetics container in use of the third embodiment of the present invention.

A third embodiment of the present invention is shown in FIGS. 9 to 11. It is distinguished from the first embodiment by the fact that a cosmetics case 14A has four concave portions 24, 24, 24, and 24 for receiving charges 23 of makeup, such as the eye shadow contained by the palette 22, and makeup brush receipt concave portion 26 contains the makeup brush 25. A cellular phone 1B with the cosmetics container 3B according to the third embodiment has similar advantages to that according to the first embodiment.

Figure 12:
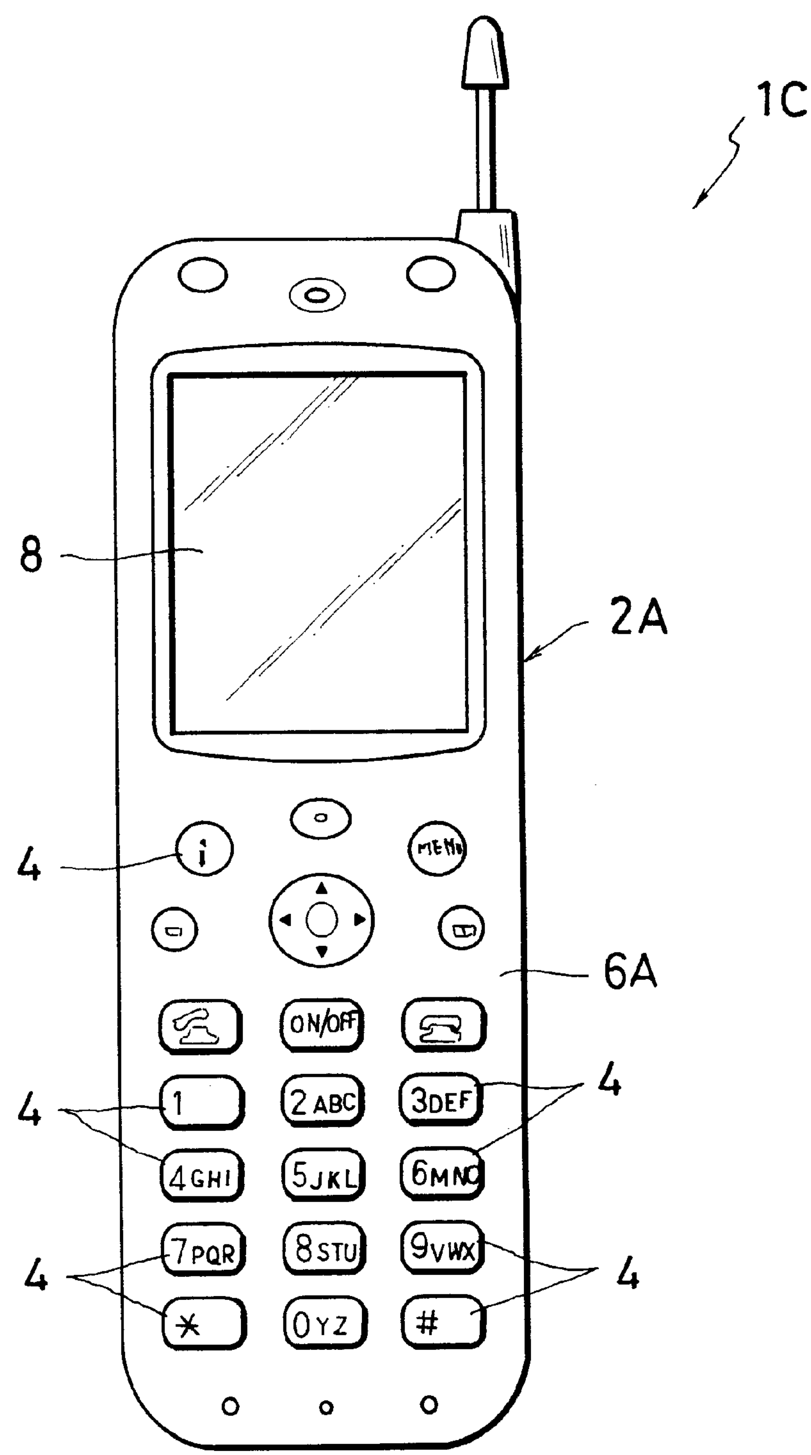
FIG. 12 is a front view showing a fourth embodiment of the present invention.
Figure 13:
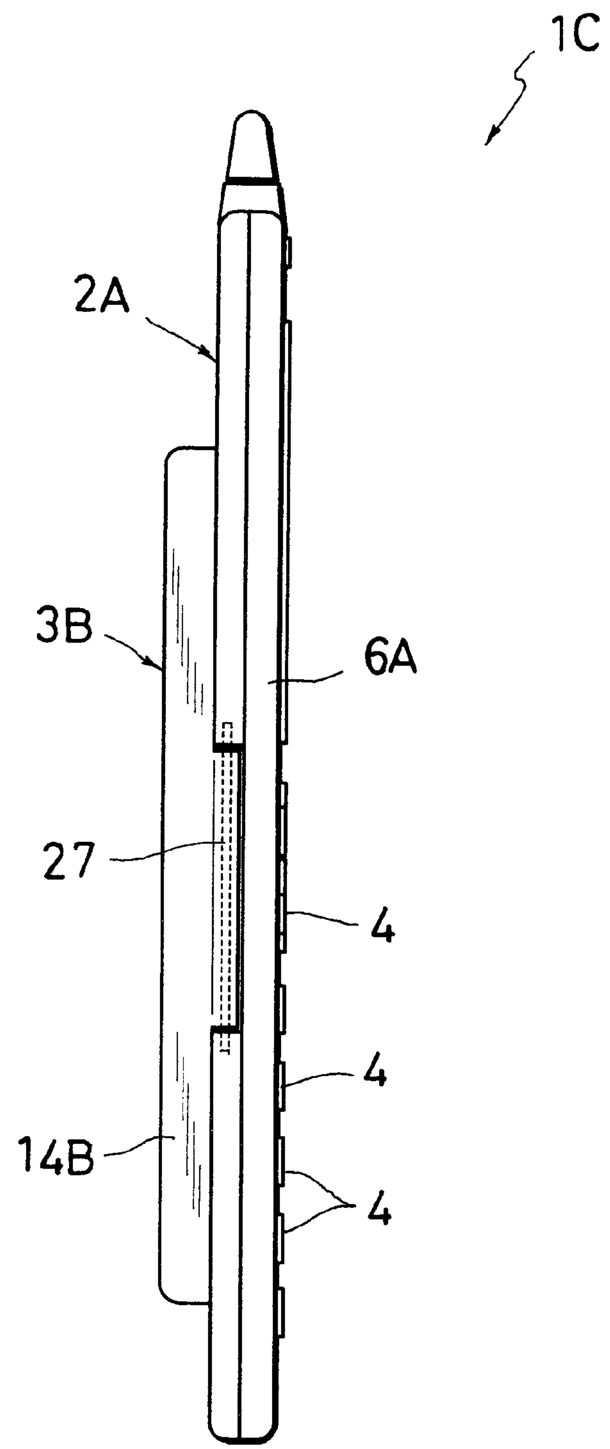
FIG. 13 is a side view showing the fourth embodiment of the present invention.
Figure 14:
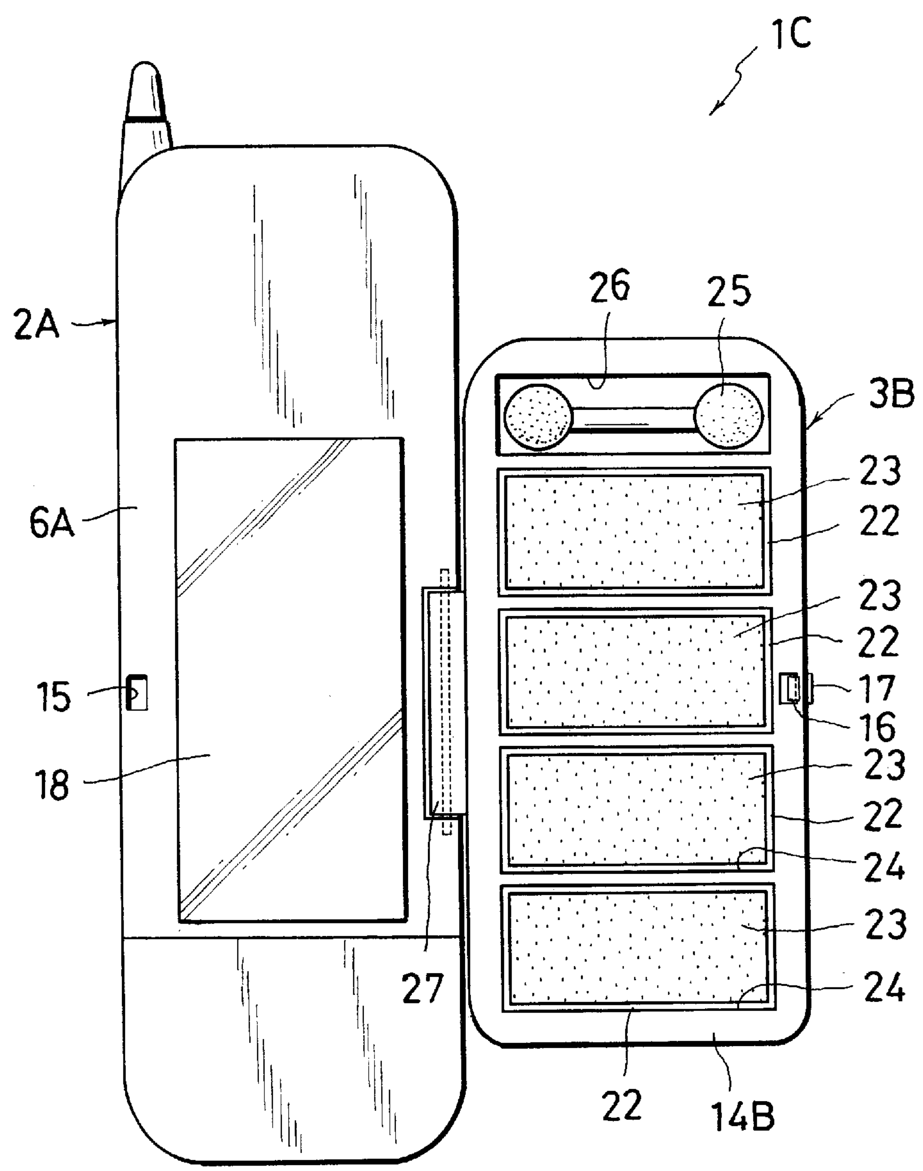
FIG. 14 is a view of a cosmetics container in use of the fourth embodiment of the present invention.

A fourth embodiment of the present invention is shown in FIGS. 12 to 14. It is distinguished from the third embodiment by the fact that the cellular phone body 2 is replaced with another cellular phone body 2A that the display 8 is formed integrally in case body 6A. Cosmetics case 14B is attached on one side of the case body 6A of cellular phone body 2A through a hinge member 27. A cellular phone 1C according to the fourth embodiment has similar advantages to that according to the third embodiment.

As set forth above, the advantages of the invention are as follows:

(1) A cellular phone comprises a cellular phone body and a cosmetics container further including a cosmetics case containing cosmetics, the case covering the back of the cellular phone body; and a mirror provided at the back of the cellular phone body and covered by the cosmetics case. Accordingly, by holding a cellular phone body, a cosmetics container is also automatically portable.

(2) As discussed above, since the cellular phone body and the cosmetics container are united, storing in a handbag is not complicated or bulky.

Therefore, the user can hold it easily and the user can take out from the handbag easily and use it easily.

(3) as discussed above, the back of a cellular phone body can be used for the cover body of a cosmetics container, and manufacturing is facilitated because the construction is simple.

What is claimed is:

1. A communication device and compact comprising:

a communication device body having a first side whereon operation input devices are provided, and a second side opposite said first side;

a cosmetic case housing having an inner side facing said first side and an outer side, said cosmetic case housing being movably connected to said communication device body to permit said cosmetic case housing to move from a position overlapping said second side of said communication device, such that said inner side faces said first side, to a position exposing said second side and said inner side of said cosmetic case housing;

said inner side of said cosmetic case housing including receptacles for cosmetics; and said second side of said communication device including a mirror surface.

2. The communication device and compact of claim 1, wherein said receptacles house a foundation material and a puff for applying said foundation material.

3. The communication device and compact of claim 2, wherein said receptacles further include housing eye shadow material.

4. The communication device and compact of claim 1, wherein said second side of said communication device is a member adhesively attached to said communication device and said cosmetic case housing is moveably attached to second side.

5. The communication device and compact of claim 4, wherein said receptacles house a foundation material and a puff for applying said foundation material.

6. The communication device and compact of claim 5, wherein said receptacles further include housing eye shadow material.

* * * * *